(12) United States Patent
Miao et al.

(10) Patent No.: US 9,603,167 B2
(45) Date of Patent: Mar. 21, 2017

(54) FEEDBACK MESSAGING

(75) Inventors: De Shan Miao, Beijing (CN); Xiaoyi Wang, Wheeling, IL (US); Peter Skov, Beijing (CN); Timo Erkki Lunttila, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 103 days.

(21) Appl. No.: 14/356,780

(22) PCT Filed: Nov. 7, 2011

(86) PCT No.: PCT/CN2011/081867
§ 371 (c)(1),
(2), (4) Date: May 7, 2014

(87) PCT Pub. No.: WO2013/067670
PCT Pub. Date: May 16, 2013

(65) Prior Publication Data
US 2014/0307631 A1   Oct. 16, 2014

(51) Int. Cl.
*H04W 4/00* (2009.01)
*H04W 74/00* (2009.01)
(Continued)

(52) U.S. Cl.
CPC ......... *H04W 74/004* (2013.01); *H04L 1/0015* (2013.01); *H04L 1/0026* (2013.01); *H04L 1/0027* (2013.01); *H04L 1/0029* (2013.01); *H04L 1/0077* (2013.01); *H04W 72/1278* (2013.01)

(58) Field of Classification Search
CPC ............. H04W 74/002; H04W 74/004; H04W 72/1278; H04W 72/1284; H04W 72/1294; H04W 72/14; H04L 1/0015; H04L 1/0026; H04L 1/0027; H04L 1/0029; H04L 1/0077
See application file for complete search history.

(56) References Cited

U.S. PATENT DOCUMENTS 8,488,535 B2 * 7/2013 Che .................. H04L 1/0026
370/329
9,083,501 B2 * 7/2015 Luo .................. H04L 5/0055
(Continued)

FOREIGN PATENT DOCUMENTS

CN   101883391 A   11/2010
CN   101911523 A   12/2010
(Continued)

*Primary Examiner* — Kevin Mew
(74) *Attorney, Agent, or Firm* — Harrington & Smith

(57) ABSTRACT

The disclosure relates to methods and apparatuses for feedback messaging in a communication system. A station can include into a scheduling information entity an indication of aperiodic feedback messaging on a physical uplink control channel and dynamically send the scheduling information entity with the indication to a communication device configured for periodic feedback messaging to trigger aperiodic feedback messaging by the communication device on the physical uplink control channel. Upon receiving the scheduling information entity the device can determine that it includes the indication and in response to the determining send at least one aperiodic feedback message on the physical uplink control channel.

30 Claims, 3 Drawing Sheets

(51) Int. Cl.
*H04L 1/00* (2006.01)
*H04W 72/12* (2009.01)

(56) References Cited

U.S. PATENT DOCUMENTS

| | | | | |
|---|---|---|---|---|
| 2006/0128410 A1* | 6/2006 | Derryberry | ............ | H04W 52/54 455/509 |
| 2008/0305745 A1* | 12/2008 | Zhang | .................. | H04L 1/0026 455/67.11 |
| 2009/0190528 A1 | 7/2009 | Chung et al. | .................. | 370/328 |
| 2009/0238121 A1* | 9/2009 | Kotecha | ................ | H04L 1/0026 370/329 |
| 2010/0113078 A1 | 5/2010 | Farajidana et al. | ........... | 455/507 |
| 2010/0118817 A1* | 5/2010 | Damnjanovic | ....... | H04L 1/0026 370/329 |
| 2010/0202311 A1* | 8/2010 | Lunttila | ................ | H04L 1/0027 370/252 |
| 2010/0271970 A1* | 10/2010 | Pan | ........................ | H04L 1/0026 370/252 |
| 2010/0311430 A1* | 12/2010 | Katayama | ............. | H04L 1/0027 455/450 |
| 2011/0019637 A1* | 1/2011 | Ojala | .................... | H04L 1/0026 370/329 |
| 2011/0141941 A1* | 6/2011 | Lee | ........................ | H04L 1/0038 370/252 |
| 2011/0200131 A1* | 8/2011 | Gao | ...................... | H04B 7/0452 375/267 |
| 2011/0249578 A1* | 10/2011 | Nayeb Nazar | ........ | H04L 1/0027 370/252 |
| 2011/0310818 A1* | 12/2011 | Lin | ...................... | H04W 72/042 370/329 |
| 2012/0002568 A1* | 1/2012 | Tiirola | .................. | H04L 1/0026 370/252 |
| 2012/0082049 A1* | 4/2012 | Chen | ...................... | H04W 24/10 370/252 |
| 2012/0106439 A1* | 5/2012 | Liu | ...................... | H04W 76/021 370/328 |
| 2012/0127869 A1* | 5/2012 | Yin | ........................ | H04L 1/0031 370/252 |
| 2012/0140708 A1* | 6/2012 | Choudhury | ......... | H04W 72/082 370/328 |
| 2012/0207047 A1* | 8/2012 | Liao | ...................... | H04L 1/0026 370/252 |
| 2012/0208547 A1* | 8/2012 | Geirhofer | ............ | H04B 7/0626 455/452.2 |
| 2012/0250541 A1* | 10/2012 | Ko | ........................ | H04L 1/0026 370/252 |
| 2012/0300641 A1* | 11/2012 | Chen | ...................... | H04L 1/0026 370/241 |
| 2012/0307757 A1* | 12/2012 | Edler Von Elbwart | ................ | H04L 1/0026 370/329 |
| 2013/0028345 A1* | 1/2013 | Ko | ........................ | H04B 7/063 375/267 |
| 2013/0077574 A1* | 3/2013 | Ekpenyong | ........... | H04L 5/0023 370/329 |
| 2013/0077596 A1 | 3/2013 | Liang et al. | .................. | 370/329 |

FOREIGN PATENT DOCUMENTS

| | | |
|---|---|---|
| CN | 102006624 A | 4/2011 |
| WO | WO 2010/148319 A1 | 12/2010 |
| WO | WO-2011/085230 A2 | 7/2011 |
| WO | WO-2012/071888 A1 | 6/2012 |

* cited by examiner

FEEDBACK MESSAGING

TECHNOLOGICAL FIELD

This disclosure relates to feedback messaging in a communication system.

BACKGROUND

A communication system can be seen as a facility that enables communication sessions between two or more entities such as fixed or mobile communication devices, base stations, servers, machine type communication devices and/or other communication nodes. A communication system and compatible communicating entities typically operate in accordance with a given standard or specification which sets out what the various entities associated with the system are permitted to do and how that should be achieved. For example, the standards, specifications and related protocols can define the manner how various aspects of communication such as access to the communication system and feedback messaging shall be implemented between communicating devices. A communication can be carried on wired or wireless carriers. In a wireless communication system at least a part of communications between stations occurs over a wireless link.

Examples of wireless systems include public land mobile networks (PLMN) such as cellular networks, satellite based communication systems and different wireless local networks, for example wireless local area networks (WLAN). A wireless system can be divided into cells or other radio coverage or service areas provided by a station. Radio service areas can overlap, and thus a communication device in an area can send signals to and receive signals from more than one station.

A communication system can be accessed by means of an appropriate communication device. A communication device of a user is often referred to as user equipment (UE) or terminal. A communication device is provided with an appropriate signal receiving and transmitting arrangement for enabling communications with other parties. Typically a communication device is used for enabling receiving and transmission of communications such as speech and data. In wireless systems a communication device provides a transceiver station that can communicate with another communication device such as e.g. a base station and/or another user equipment.

An example of communication systems is an architecture that is being standardized by the 3rd Generation Partnership Project (3GPP) and referred to as the long-term evolution (LTE) of the Universal Mobile Telecommunications System (UMTS) radio-access technology. A further development of the LTE is often referred to as LTE-Advanced. The various development stages of the 3GPP LTE specifications are referred to as releases.

Feedback information from communication devices is needed by the network. Feedback reports can be periodic or aperiodic. Periodic feedback is considered an important component of LTE feedback mechanism and applies the design principle of semi-static and periodic configuration the different feedback messages where the user equipment (UE) follows a predefined pattern of feedback messages. Physical Uplink Control Channel (PUCCH) is a dedicated channel used for the periodic feedback messages and continual tracking of channel state information (CSI). The CSI can include elements such as Channel quality indicator (CQI), Precoding matrix indicator (PMI), Precoder Type Indicator (PTI) and Rank indicator (RI). Compared to aperiodic feedback, an advantage of periodic feedback is that it does not need to be triggered by an uplink (UL) grant because of the semi-statically configured PUCCH resource for the feedback messaging.

More advanced transmission schemes can become increasingly desirable with the technical evolution. More advanced transmission schemes might benefit from support of more flexible feedback schemes. For example, multipoint schemes such as Coordinated Multi-Point Transmission (COMP) might benefit from additional feedback information, in particular inter-cell channel state information (CSI) feedback support. Currently the periodic channel state information (CSI) feedback can only be transmitted in the pre-assigned resources on PUCCH following a pre-configured pattern of different feedback messages. Configuration for periodic feedback is provided through radio resource control (RRC) signalling for a long period of time. Hence, sometimes PUCCH resource can become reserved even if it is not necessary. A periodic feedback can be inflexible in the sense of both resource allocation and feedback content.

Aperiodic feedback messaging can be used to compensate for the inflexibility of the periodic feedback. LTE Release 8 suggests aperiodic CSI-only reporting on Physical Uplink Shared Channel (PUSCH) to support uplink control indicator (UCI) PUSCH transmission. However, the inventors have recognised that use of aperiodic feedback of the current LTE mechanisms may not always be suitable, in particular where only a small number of dynamic feedback bits is needed. For example, on LTE aperiodic feedback must be transmitted with UL PUSCH, and therefore needs to be triggered by an UL grant. Although this can provide improved flexibility, use of the PUSCH can provide certain disadvantages. Use of aperiodic PUSCH feedback can waste UL resources since the resource allocation granularity can be too coarse. PUSCH granularity is one physical resource block (PRB) which can be excessive for instantaneous (e.g. wideband) feedback which typically consists of only about 10 bits. Also, dedicated separate UL grant downlink control indicator (DCI) needs to be transmitted just to trigger the CQI only PUSCH, and thus the overhead on the Physical Downlink Control Channel (PDCCH) is increased.

It is noted that the above discussed issues are not limited to any particular communication environment, but may occur in any appropriate communication system with retransmission mechanism and comprising a plurality of reception points.

BRIEF SUMMARY

Embodiments of the invention aim to address one or several of the above issues.

In accordance with an embodiment there is provided a method for receiving feedback in a station, comprising including into a scheduling information entity an indication of aperiodic feedback messaging on a physical uplink control channel, and sending the scheduling information entity with the indication to a communication device configured for periodic feedback messaging to trigger aperiodic feedback messaging by the communication device on the physical uplink control channel.

In accordance with an embodiment there is provided a method for sending feedback from a communication device configured for periodic feedback messaging, comprising receiving a scheduling information entity, determining from the scheduling information entity an indication of aperiodic feedback messaging on a physical uplink control channel, and in response to the determining, sending at least one aperiodic feedback message on the physical uplink control channel.

In accordance with an embodiment there is provided an apparatus for controlling feedback messaging, the apparatus comprising at least one processor, and at least one memory including computer program code, wherein the at least one memory and the computer program code are configured, with the at least one processor, to include into a scheduling information entity an indication of aperiodic feedback messaging on a physical uplink control channel, and cause sending of the scheduling information entity with the indication to a communication device configured for periodic feedback messaging to trigger aperiodic feedback messaging by the communication device on the physical uplink control channel.

In accordance with an embodiment there is provided an apparatus for controlling feedback messaging, the apparatus comprising at least one processor, and at least one memory including computer program code, wherein the at least one memory and the computer program code are configured, with the at least one processor, to determine from a received scheduling information entity an indication of aperiodic feedback messaging on a physical uplink control channel, and in response to the determining, cause sending of at least one aperiodic feedback message on the physical uplink control channel by a communication device configured for periodic feedback messaging.

In accordance with a more specific aspect the scheduling information entity comprises a downlink assignment or an uplink grant.

The feedback may comprise channel state information.

Content of a feedback message may be controlled by means of the indication.

The aperiodic feedback messaging may comprise transmission of a feedback message that is different to a preconfigured periodic feedback message. According to a possibility the aperiodic feedback messaging comprises dynamic transmission of a periodic feedback message. The aperiodic feedback messaging may comprise transmission of a specific aperiodic feedback message.

The aperiodic feedback messaging may comprise sending of at least one aperiodic feedback message in at least one physical uplink control channel reporting instance according to the periodic feedback reporting configuration that follows a time instance where the indication was received by the communication device.

Different resources of a physical uplink control channel may be used for aperiodic feedback messaging and periodic feedback messaging. This can include use of different orthogonal cover code for reference signals and/or data part of the aperiodic messaging.

The type of at least one aperiodic message may be preconfigured. An indication of the type of at least one aperiodic message may be provided by the indication.

The aperiodic feedback messaging may be provided for the purposes of obtaining feedback for coordinated multipoint transmissions.

The apparatuses may be provided and the methods implemented in a node for a communication system.

A computer program comprising program code means adapted to perform the methods may also be provided.

Various other aspects and further embodiments are also described in the following detailed description and in the attached claims.

BRIEF DESCRIPTION OF THE DRAWINGS

The invention will now be described in further detail, by way of example only, with reference to the following examples and accompanying drawings, in which.

DETAILED DESCRIPTION

Certain exemplifying embodiments are explained below with reference to a wireless or mobile communication system serving mobile communication devices. Before explaining in detail the exemplifying embodiments, certain general principles of a wireless communication system and mobile communication devices are briefly explained with reference to FIGS. 1 to 3 to assist in understanding the technology underlying the described examples.

Figure 1:
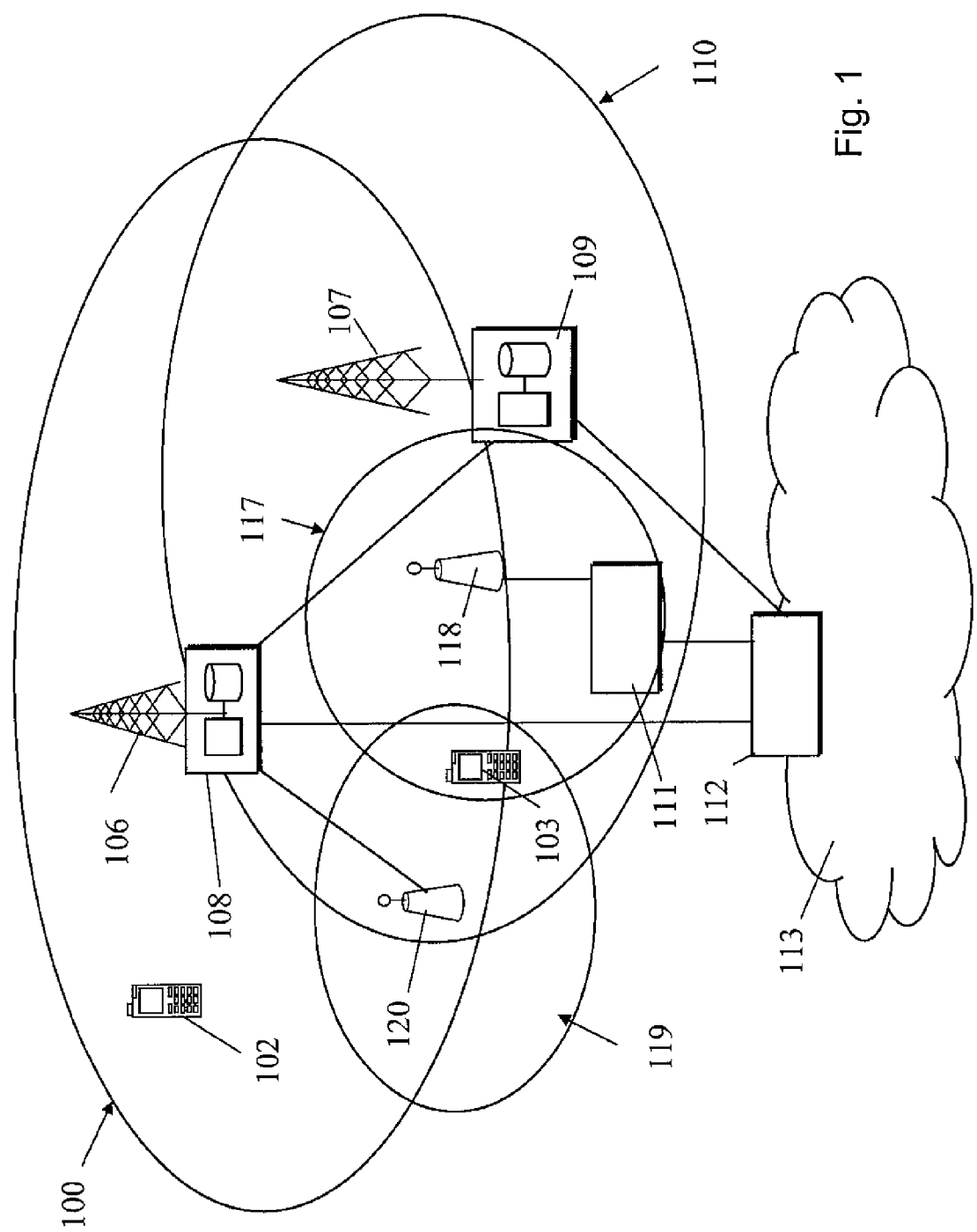
FIG. 1 shows a schematic diagram of a system where some embodiments are applicable.

In a wireless communication system mobile communication devices or user equipment (UE) 102, 103 are provided wireless access via at least one base station or similar wireless transmitting and/or receiving node or point. In the example of FIG. 1 shows overlapping access systems or radio service areas 100 and 110 of a cellular system and smaller radio service areas 117 and 119 provided by base stations 106, 107, 118 and 120. For example, in the LTE the transmission/reception points can comprise wide area network nodes such as macro eNode B (eNB) which may, for example, provide coverage for an entire cell or similar radio service area. Network nodes can also be small or local radio service area network nodes, for example Home eNBs (HeNB), pico eNodeBs (pico-eNB), or femto nodes. Some applications may utilise radio remote heads (RRH) that are connected to, for example, an eNB. The smaller radio service areas can be located wholly or partially within the larger radio service area. The nodes of the smaller radio service areas may be configured to support local offload. The local nodes can also, for example, be configured to extend the range of a cell. Communication device 103 may thus be located within, and thus communicate with, more than one radio service area and the communication devices and stations may have one or more radio channels open at the same time and may send signals to and/or receive signals from more than one source. It is noted that the radio service area borders or edges are schematically shown for illustration purposes only in FIG. 1. It shall also be understood that the sizes and shapes of radio service areas may vary considerably from the shapes of FIG. 1. A base station site can provide one or more cells. A base station can also provide a plurality of sectors, for example three radio sectors, each sector providing a cell or a subarea of a cell. All sectors within a cell can be served by the same base station.

Base stations are typically controlled by at least one appropriate controller apparatus so as to enable operation thereof and management of mobile communication devices in communication with the base stations. In FIG. 1 control apparatus 108 and 109 is shown to control the respective macro level base stations 106 and 107. It is noted that more than one macro level base station may be controlled e.g. by control apparatus 108. The control apparatus of a base station can be interconnected with other control entities. The control apparatus is typically provided with memory capacity and at least one data processor. The control apparatus and functions may be distributed between a plurality of control units.

In FIG. 1 stations 106 and 107 are shown being connected to a wider communications network 113 via gateway 112. A further gateway function may be provided to connect to another network. The smaller area stations 118 and 120 can also be connected to the network 113, for example by a separate gateway function and/or via the controllers of the macro level stations. In the example, station 118 is connected via a gateway 111 whilst station 120 can provide a remote radio head that connects via the controller apparatus 108.

Figure 2:
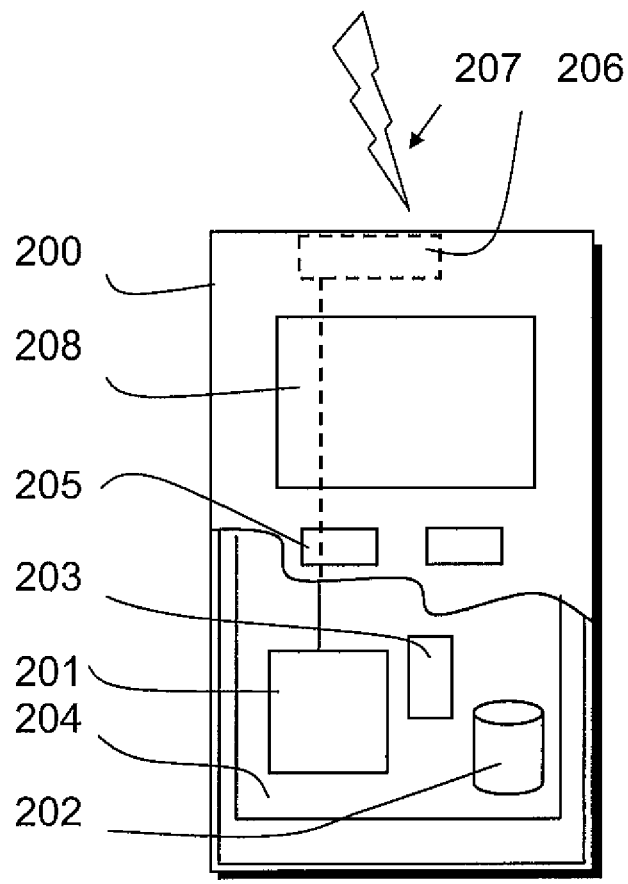
FIG. 2 shows a schematic diagram of a mobile communication device according to some embodiments.

FIG. 2 is a schematic, partially sectioned view of a possible mobile communication device 200 for communication with the stations. Such a communication device is often referred to as user equipment (UE) or terminal. An appropriate mobile communication device may be provided by any device capable of sending and receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. User may also be provided broadcast or multicast data. Non-limiting examples of the content include various downloads, television and radio programs, videos, advertisements, various alerts and other information. The mobile device 200 may receive signals over an air interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device. A wireless communication device can be provided with a Multiple Input/Multiple Output (MIMO) antenna system.

A mobile device is also typically provided with at least one data processing entity 201, at least one memory 202 and other possible components 203 for use in software and hardware aided execution of tasks it is designed to perform, including control of access to and communications, such as communication of data and control signals with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

Figure 3:
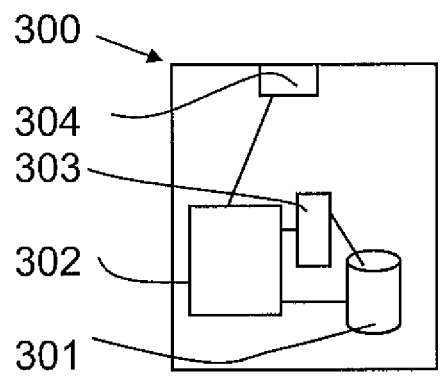
FIG. 3 shows a schematic diagram of a control apparatus according to some embodiments.

FIG. 3 shows an example of a control apparatus for a communication system, for example to be coupled to and/or for controlling one or more stations of an access system. In some embodiments base stations comprise a separate control apparatus. In other embodiments the control apparatus can be another network element. The control apparatus 300 can be arranged to provide control on communications in a service area of the system. The control apparatus 108 can be configured to provide control functions in association with generation and communication of instructions in view of feedback messaging by relevant communication devices and other related information by means of the data processing facility in accordance with certain embodiments described below. For this purpose the control apparatus 300 comprises at least one memory 301, at least one data processing unit 302, 303 and an input/output interface 304. Via the interface the control apparatus can be coupled to a receiver and a transmitter of a base station. The control apparatus 109 can be configured to execute an appropriate software code to provide the control functions. It shall be appreciated that similar component can be provided in a control apparatus provided elsewhere in the system for controlling reception of sufficient information for decoding of received information blocks.

A non-limiting example of the recent developments in communication system architectures is the long-term evolution (LTE) of the Universal Mobile Telecommunications System (UMTS) that is being standardized by the 3rd Generation Partnership Project (3GPP). Non-limiting examples of appropriate LTE access nodes are a base station of a cellular system, for example what is known as NodeB (NB) in the vocabulary of the 3GPP specifications. The LTE employs a mobile architecture known as the Evolved Universal Terrestrial Radio Access Network (E-UTRAN). Base stations of such systems are known as evolved or enhanced Node Bs (eNBs) and may provide E-UTRAN features such as user plane Radio Link Control/Medium Access Control/Physical layer protocol (RLC/MAC/PHY) and control plane Radio Resource Control (RRC) protocol terminations towards the communication devices. Other examples of radio access system include those provided by base stations of systems that are based on technologies such as wireless local area network (WLAN) and/or WiMax (Worldwide Interoperability for Microwave Access).

Figure 4:
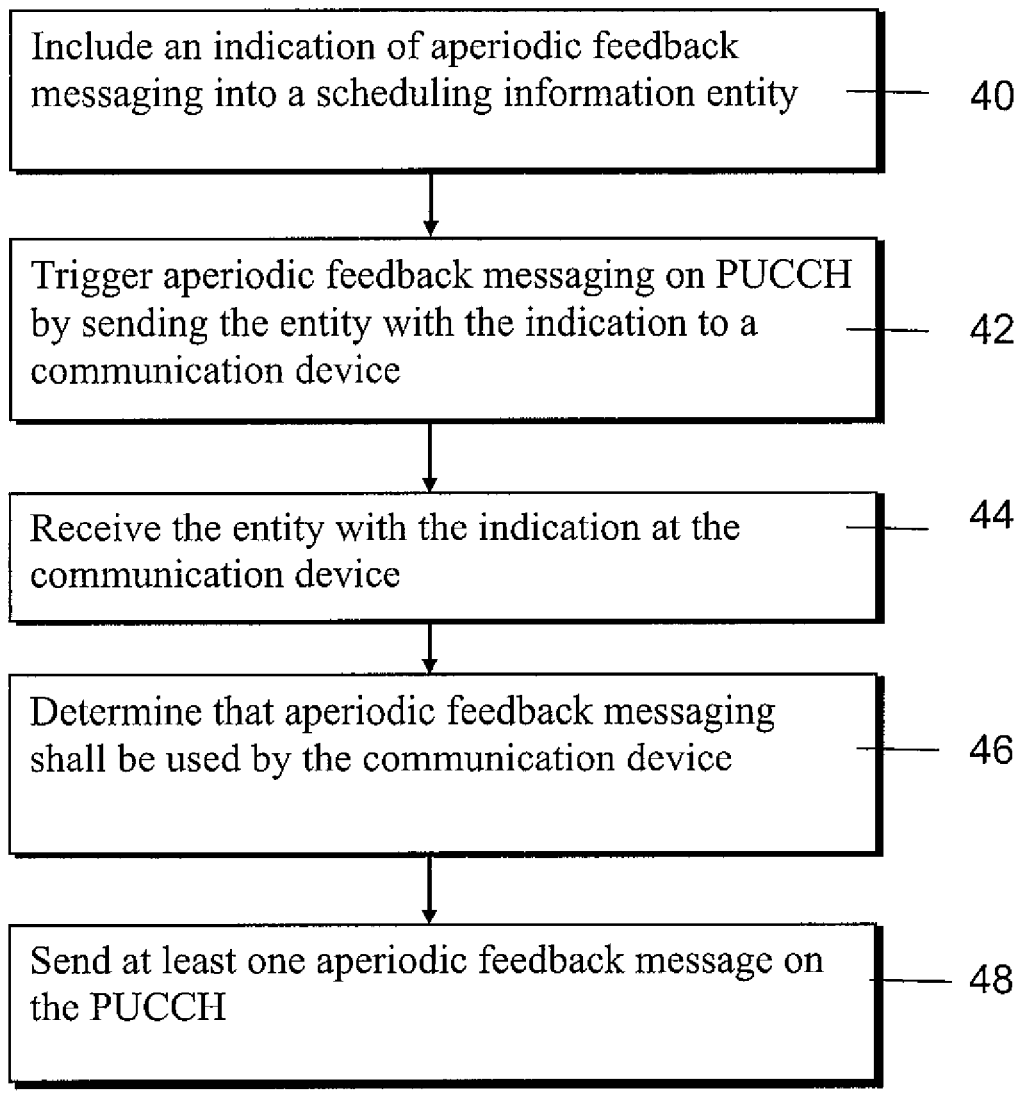
FIG. 4 shows a flow chart according to an embodiment.

FIG. 4 shows a flowchart in accordance with an embodiment where a station, for example an eNB, can be adapted to dynamically indicate to a communication device configured for periodic feedback messaging that aperiodic messaging shall be used for feedback reporting on a physical uplink control channel instead of or in parallel with the preconfigured periodic feedback messaging. Dynamic triggering of the aperiodic feedback messaging is provided by including in a scheduling information entity an indication of the aperiodic feedback messaging at 40. The scheduling information entity is then sent at 42 with the indication to the communication device to trigger aperiodic feedback messaging on the physical uplink control channel. The communication device receives the scheduling information entity at 44 and determines at 46 that the scheduling information entity provides an indication of a need for aperiodic feedback messaging on the physical uplink control channel. In response to the determining, at least one aperiodic feedback message is then sent at 48 on the physical uplink control channel to the station.

In accordance with an embodiment the station, for example an eNB can be adapted to dynamically indicate to a communication device that it shall change the content of a channel state information (CSI) feedback message carried on a physical uplink control channel (PUCCH). PUCCH resource is considered a suitable media for carrying feedback information such as the CSI. Aperiodic feedback messaging may be provided by sending, in response to a request by a network entity such as an eNB, different feedback information content in a transmission time interval (TTI) that is reserved for use in a preconfigured manner in accordance with the periodic feedback messaging. Facilitation of use of PUCCH also for aperiodic feedback messaging is considered advantageous even if predefined periodic transmission instances are used for transmission of dynamically defined content. Scheduling information entities such as downlink (DL) assignment or uplink (UL) grant can be used as a trigger for switching between the different content formats.

When transmitting a dynamically indicated feedback message a communication device may use different PUCCH resources than it would use for the pre-configured feedback messages. This can be provided e.g. for data and/or reference signals. For example, the communication device can transmit an aperiodic feedback message including for example channel state information (CSI) on PUCCH as indicated by a PDCCH scheduling entity such that the communication device selects the PUCCH resource on which the feedback message is transmitted to be different from the semi-static configuration. One example of this is where the resource on which the PUCCH reference signal (RS) for the CSI is transmitted is selected to be different from the one that is semi-statically configured for that communication device.

In accordance with an embodiment the triggering procedure may be such that an eNB configures semi-static periodic feedback to a user equipment (UE) for a relatively long period of time. This can include configuration of a resource and message content pattern. The UE then follows the pre-configuration based on the pattern and transmits corresponding periodic feedback messages at a pre-assigned PUCCH resource. At a particular transmission timing interval (TTI) the eNB uses at least one additional bit or code point in a DL assignment or UL grant message to inform the UE that its shall transmit a dynamic feedback message in the next PUCCH reporting instance or N next PUCCH reporting instances.

The form of the dynamic feedback message may be pre-configured. Alternatively, the form of the dynamic feedback message may be implicitly indicated by the DL assignment or UL grant itself. The contents and potentially the payload of this dynamic message may be different from those of the pre-configured messages.

The UE then follows the instructions by the eNB to transmit the corresponding aperiodic feedback messages.

When transmitting an aperiodic CSI feedback message, the UE can use different PUCCH resources for data and/or reference signals than the ones indicated in the periodic CSI configuration.

The dynamic feedback message can correspond to one of the existing periodic feedback messages. E.g. the eNB may demand for a confirmation for existing signalling. In this case the dynamic feedback message may consist of e.g. a Rank Indicator to prevent error propagation. Alternatively, or in addition, at least one new message may be generated for the purposes of the dynamic feedback messages. For example, a new CoMP related feedback message may be provided.

In order to trigger an aperiodic feedback message in the PUCCH, a DL assignment downlink control indicator (DCI) can be appended with one or several bits to indicate the triggering of aperiodic feedback. In case of only one bit is inserted, '0' can be defined to indicate "no triggering" of any feedback messaging and '1' can be defined to indicate triggering of feedback messaging, or vice versa. In case of multiple bits are inserted, the triggering bits can further indicate the type of the dynamical feedback message that is wanted for this triggering.

According to an embodiment one DL assignment or UL grant can trigger only one subsequent PUCCH report. The periodic PUCCH report after TTI n+x shall then be used by the communication device to respond the DL assignment or an UL grant triggering. In here TTI n refers to a particular DL assignment or an UL grant transmitted from eNB and x is processing time. The processing time may have been predefined in a specification.

According to a more advanced possibility a DL assignment or an UL grant is used to trigger multiple consecutive PUCCH reports. The number of PUCCH reports can either be pre-configured (e.g. by means of RRC configuration) or implicitly or explicitly indicated in the UL grant or DL assignment.

For the resource to be used when a dynamic feedback message is transmitted an option with low uplink UL overhead is to apply different orthogonal cover code (OCC) for the reference signals (e.g. [1, −1] instead of [1, 1]). This allows for the eNodeB to detect whether the UE has correctly received the indication in the DL assignment or an UL grant Thus blind detection of PDCCH DCI signalling error can be provided. The orthogonal cover code (OCC) of PUCCH references signals may be selected depending on the contents of the feedback message as indicated by the UL grant or DL assignment.

In embodiments where UL grant based triggering is provided the resource allocation field of the UL grant can be used to point out which PUCCH resources shall be used for the transmission as this field points to the physical resource block and the demodulation reference signal cyclic shift indicates the cyclic shift/OCC within the physical resource block.

An example of possible uses of the above described principles relates to coordinated multi-point (CoMP) transmissions where it may be desirable to switch a CoMP transmission mode to fit varying network load and channel state changes. In order to facilitate a transmission scheme switch, an eNB should be able to request for user equipment (UE) CSI feedback under predefined feedback mode dynamically. Aperiodic feedback can support such functionality, and the dynamic triggering as described above can be used to avoid any substantial increase in the overhead on the PDCCH. Coordinated multi-point reception (CoMP) is considered as a tool to improve the coverage of high data rates, to increase data rates at cell edge, and to increase system throughput. Uplink CoMP implies reception of the signal from a user equipment at multiple, geographically separated points connected via appropriate backhaul connections.

More detailed implementation examples will now be described with reference to Tables 1 to 4. A user equipment (UE) can be configured in periodic feedback, for example such that the feedback duty cycle is 10 ms with message pattern shown in the upper and middle rows of Table 1 below.

TABLE 1

| TTI | 1 | 11 | 21 | 31 | 41 | 51 |
|---|---|---|---|---|---|---|
| Configured Periodic Message | RI | WB CQI | SB CQI | SB CQI | SB CQI | SB CQI |
| Actual Transmitted Messages | RI | WB | SB CQI | RI | SB CQI | SB CQI |

In this example rank indicator (RI) message is of PUCCH report type 3, Wide-band (WB) channel quality indicator (CQI) message is of PUCCH report type 4, and sub-band (SB) CQI is of PUCCH report type 1.

At transmission time interval (TTI) 23 eNB can transmit a DL assignment or an UL grant triggering a dynamic feedback messaging by the UE in PUCCH. The UE shall then transmit a dynamical feedback message in the next possible PUCCH report instance. In this example this would be TTI 31. In this example the eNB wants the UE to re-transmit the RI message to confirm whether the previously received RI is correct or not. RRC signalling can be used to pre-configure RI as the dynamical feedback message. By means of sending RI instead of CQI dynamic feedback can be used to prevent error propagation. This added flexibility is beneficial especially in the case when a CSI report may be dropped e.g. due to simultaneous transmission of an ACK/NACK.

According to another example an UE can be configured in periodic feedback with feedback duty cycle is 10 ms and a message pattern shown in Table 2 below.

TABLE 2

| TTI | 1 | 11 | 21 | 31 | 41 | 51 |
|---|---|---|---|---|---|---|
| Configured PUCCH PeriodicMessage | RI | WB CQI | SB CQI | SB CQI | SB CQI | SB CQI |
| Actual Transmitted Messages | RI | WB | SB CQI | CoMP CQI | SB CQI | SB CQI |

In this example RI is of PUCCH report type 3, wide-Band (WB) CQI is of PUCCH report type 4, sub-band (SB) CQI is of PUCCH report type 1, and CoMP CQI is a new PUCCH report message defined for CoMP transmission.

At TTI 23 the eNB can transmit a UL grant or DL assignment triggering a dynamic feedback in the PUCCH. Then, the UE can transmit a CoMP CQI which assumes CoMP transmission. RRC signalling may be used to pre-configure the CoMP CQI as the dynamic feedback message.

In accordance with a further example semi-persistent packet scheduling (SPS) can be supported. The upper and middles rows in Table 3 below show how a UE is configured for periodic feedback with feedback duty cycle of 10 ms.

TABLE 3

| TTI | 1 | 11 | 21 | 31 | 41 | 51 |
|---|---|---|---|---|---|---|
| Configured UCCH Periodic Message | RI | WB CQI | SB CQI | SB CQI | SB CQI | SB CQI |
| Actual Transmitted Messages | RI | WB | SB CQI | SB PMI | SB PMI | SB PMI |

At TTI 23 the UE can receive a SPS UL grant or DL assignment (e.g. scrambled with SPS C-RNTI) indicating a semi-persistent resource grant on a certain bandwidth. This UL grant or DL assignment can also indicate a need for a dynamic feedback report. The UE shall then transmit sub-band (SB) precoding matrix indicator (PMI) feedback at TTIs 31, 41 and 51 where the PMI is calculated corresponding to the semi-persistent granted bandwidth only. The trigger can be predefined to provide a trigger for a PMI feedback message. Also, the number of PMI messages to be sent can be predefined. Alternatively, this information can be indicated by the UL grant/DL assignment carrying the trigger. The aperiodic feedback report of this example can be provided by means of a new message.

The next example illustrates how to support multiple types of dynamic messages. Firstly, in a UL grant or DL assignment two bits are appended, for example such that "00" means no triggering of dynamic feedback and "01"-"11" means triggering dynamic feedback message types 1-3. The eNB can configure any of the dynamic feedback message types 1-3 as needed through RRC signalling in advance.

Now, similar to previous examples, Table 4 below shows how a UE is configured in periodic feedback with feedback duty cycle of 10 ms.

TABLE 4

| TTI | 1 | 11 | 21 | 31 | 41 | 51 |
|---|---|---|---|---|---|---|
| Configured PUCCH Periodic Message | RI | WB CQI | SB CQI | SB CQI | SB CQI | SB CQI |
| Actual Transmitted Messages | RI | WB | SB CQI | CoMP CQI | SB CQI | CoMP PMI |

At TTI 23 the UE can receive a UL grant or DL assignment including a trigger for dynamic message type 1 resulting sending of CoMP CQI at the next possible instance at TTI 31. At TTI 44, the UE can receive another UL grant or DL assignment triggering a dynamic message type 3. The UE is shown to report a corresponding message including CoMP PMI in the PUCCH at TTI 51.

It is noted that examples of the types are given for illustrative purposes only and that the message types can be different from those used in the examples.

The herein described embodiments may provide only a small additional overhead as only one or a few bits may need to be introduced into a scheduling information entity such as UL grant or DL assignment (DCI). The overhead is less than it would be in arrangements that are based on PUSCH aperiodic feedback, from both UL PUSCH and DL PDCCH point of view. PUCCH usage efficiency may be improved since only feedback that is wanted and/or considered necessary by the eNB is reported. Some of the embodiments may offer more triggering opportunities under frequent DL DCI transmissions. For example, DL assignment can be used to trigger a dynamical report in the PUCCH and UL grant can be used to trigger PUSCH with an UCI.

The required data processing apparatus and functions of a control apparatus for the determination, triggering and/or control of transmissions in relation to feedback messaging may be provided by means of one or more data processor. The described functions may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

An appropriately adapted computer program code product or products may be used for implementing the embodiments, when loaded or otherwise provided on an appropriate data processing apparatus, for example for causing determinations if and when aperiodic feedback messaging is desired, for causing transmissions of the indications and the feedback messages and any other related operations. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments of the inventions may be practiced in various components such as integrated circuit modules. The design of integrated circuits is by and large an automated process. Complex and powerful tools are available for converting a logic level design into a semiconductor circuit design ready to be formed on a semiconductor substrate.

It is noted that whilst embodiments have been described in relation to LTE, similar principles can be applied to any other communication system where dynamic feedback messaging may be desired. Therefore, although certain embodiments were described above by way of example with reference to certain exemplifying architectures for wireless networks, technologies and standards, embodiments may be applied to any other suitable forms of communication systems than those illustrated and described herein.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. For example, a combination of one or more of any of the other embodiments previously discussed can be provided. All such and similar modifications of the teachings of this invention will still fall within the scope of this invention as defined in the appended claims.

What is claimed is:

1. A method comprising:
   determining a need to trigger aperiodic feedback messaging on a physical uplink control channel from a communication device configured for periodic feedback messaging;
   including in a scheduling information entity an indication to provide aperiodic feedback messaging on the physical uplink control channel;
   sending the scheduling information entity with the indication to the communication device to trigger the aperiodic feedback messaging by the communication device on the physical uplink control channel;
   dynamically controlling content of the aperiodic feedback messaging with the sent indication, wherein the controlling causes the communication device to send feedback information content in the aperiodic feedback messaging different from that reserved for use in a preconfigured manner in the periodic feedback messaging,
   whereby the need for a separate uplink grant message on a physical downlink control channel to trigger the aperiodic feedback messaging on the physical uplink control channel is avoided.

2. A method comprising:
   receiving, from a base station, a scheduling information entity having an indication to provide aperiodic feedback messaging on a physical uplink control channel to the base station;
   determining the indication from the scheduling information entity;
   controlling content of the aperiodic feedback messaging based on the received indication; and
   sending, based on the received indication, feedback information content in the aperiodic feedback messaging on the physical uplink control channel to the base station in response to the indication, wherein the content is different from that reserved for use in a preconfigured manner in periodic feedback messaging,
   whereby the need for a separate uplink grant message on a physical downlink control channel to trigger the aperiodic feedback messaging on the physical uplink control channel is avoided.

3. A method as claimed in claim 1, wherein the scheduling information entity comprises a downlink assignment or an uplink grant.

4. A method as claimed in claim 1, wherein the feedback comprises channel state information.

5. A method as claimed in claim 1, wherein the aperiodic feedback messaging comprises dynamic transmission of a periodic feedback message.

6. A method as claimed in claim 1, wherein the aperiodic feedback messaging comprises transmission of a specific aperiodic feedback message.

7. A method as claimed in claim 1, wherein the aperiodic feedback messaging comprises sending of at least one aperiodic feedback message in at least one physical uplink control channel reporting instance according to the periodic feedback reporting configuration that follows a time instance where the indication was received by the communication device.

8. A method as claimed in claim 1, comprising using different resources of the physical uplink control channel for aperiodic feedback messaging and periodic feedback messaging.

9. A method as claimed in claim 8, comprising using different orthogonal cover code for reference signals and/or data part of the aperiodic messaging.

10. A method as claimed in claim 1, wherein the indication comprises at least one bit or code point.

11. A method as claimed in claim 1, comprising preconfiguring the type of at least one aperiodic message.

12. A method as claimed in claim 1, comprising providing an indication of the type of at least one aperiodic message by the indication.

13. A method as claimed in claim 1, comprising triggering the aperiodic feedback messaging for the purposes of feedback for coordinated multipoint transmissions.

14. An apparatus comprising:
   at least one processor; and
   at least one memory including computer program code,
      the at least one memory and the computer program code configured, with the at least one processor, to cause the apparatus to:

determine a need to trigger aperiodic feedback messaging on a physical uplink control channel from a communication device configured for periodic feedback messaging;

include in a scheduling information entity an indication to provide aperiodic feedback messaging on the physical uplink control channel; and send the scheduling information entity with the indication to the communication device to trigger the aperiodic feedback messaging by the communication device on the physical uplink control channel;

dynamically control content of the aperiodic feedback messaging with the sent indication, wherein the controlling causes the communication device to send feedback information content in the aperiodic feedback messaging different from that reserved for use in a preconfigured manner in the periodic feedback messaging, whereby the need for a separate uplink grant message on a physical downlink control channel to trigger the aperiodic feedback messaging on the physical uplink control channel is avoided.

15. An apparatus comprising:

at least one processor; and at least one memory including computer program code, the at least one memory and the computer program code configured, with the at least one processor, to cause the apparatus to:

receive, from a base station, a scheduling information entity having an indication to provide aperiodic feedback messaging on a physical uplink control channel to the base station;

determine the indication from the scheduling information entity;

control content of the aperiodic feedback messaging based on the received indication; and send, based on the received indication, feedback information content in the aperiodic feedback messaging on the physical uplink control channel to the base station in response to the indication, wherein the content is different from that reserved for use in a preconfigured manner in periodic feedback messaging, whereby the need for a separate uplink grant message on a physical downlink control channel to trigger the aperiodic feedback messaging on the physical uplink control channel is avoided.

16. An apparatus according to claim 14, wherein the scheduling information entity comprises a downlink assignment or an uplink grant.

17. An apparatus as claimed in claim 14, wherein the feedback comprises channel state information.

18. An apparatus as claimed in claim 14, configured to trigger dynamic transmission of a periodic feedback message.

19. An apparatus as claimed in claim 14, configured to cause transmission of a specific aperiodic feedback message.

20. An apparatus as claimed in claim 14, configured to cause sending of at least one aperiodic feedback message in at least one physical uplink control channel reporting instance according to a periodic feedback reporting configuration of the communication device, wherein the at least one instance follows a time instance where the indication was received by the communication device.

21. An apparatus as claimed in claim 14, configured to cause use of different resources of the physical uplink control channel for aperiodic feedback messaging and periodic feedback messaging.

22. An apparatus as claimed in claim 21, configured to cause use of different orthogonal cover code for reference signals and/or data part for of the aperiodic messaging.

23. An apparatus as claimed in claim 14, wherein the indication comprises at least one bit or code point.

24. An apparatus as claimed in claim 14, configured to use at least one preconfigured aperiodic message.

25. An apparatus as claimed in claim 14, configured to provide an indication of the type of at least one aperiodic message by the indication.

26. An apparatus as claimed in claim 14, configured to cause triggering of the aperiodic feedback messaging for the purposes of feedback for coordinated multipoint transmissions.

27. A node for a communication system comprising the apparatus as claimed in claim 14.

28. A communication system comprising an apparatus according to claim 14.

29. A computer program product comprising a non-transitory computer-readable storage medium bearing computer program code embodied therein for use with a computer, the computer program code comprising code which, when executed by a processor, causes the method according to claim 1 to be performed.

30. A computer program product comprising a non-transitory computer-readable storage medium bearing computer program code embodied therein for use with a computer, the computer program code comprising code which, when executed by a processor, causes the method according to claim 2 to be performed.

* * * * *